United States Patent
Brandenburger

(10) Patent No.: US 6,644,096 B2
(45) Date of Patent: Nov. 11, 2003

(54) HYDROPNEUMATIC SUSPENSION FOR VEHICLES HAVING GREATLY VARYING AXLE LOADS

(75) Inventor: Walter Brandenburger, Neuss (DE)

(73) Assignee: Firma Carl Freudenberg, Weinheim (DE)

(*) Notice: Subject to any disclaimer, the term of this patent is extended or adjusted under 35 U.S.C. 154(b) by 0 days.

(21) Appl. No.: 10/075,550

(22) Filed: Feb. 13, 2002

(65) Prior Publication Data
US 2002/0157451 A1 Oct. 31, 2002

(30) Foreign Application Priority Data
Feb. 15, 2001 (DE) .......................... 101 07 644

(51) Int. Cl.[7] .............................................. G01M 15/00
(52) U.S. Cl. ..................................... 73/11.04; 73/11.04
(58) Field of Search .......................... 280/124 F, 617, 280/683, 112, 112 A; 73/11.04, 11.06, 168, 669, 805, 514.37

(56) References Cited

U.S. PATENT DOCUMENTS 3,912,303 A * 10/1975 Thate et al. ................. 280/124
3,913,938 A * 10/1975 Aikawa et al. .............. 280/112
3,963,261 A * 6/1976 Hiruma ....................... 280/683

FOREIGN PATENT DOCUMENTS

| DE | 41 20 758 | 1/1992 |
| DE | 42 42 448 | 3/1994 |
| DE | 197 19 077 | 11/1998 |

* cited by examiner

Primary Examiner—Kamand Cuneo
Assistant Examiner—Monica D. Harrison
(74) Attorney, Agent, or Firm—Kenyon & Kenyon

(57) ABSTRACT

In a hydropneumatic suspension for vehicles having greatly varying axle loads, in particular tractors having hydraulic suspension cylinders that are connectable to a pneumatic feed pump via supply lines—with a pressure regulating valve being provided in the supply line leading to the annular spaces of the suspension cylinders—the pressure regulating valve being designed as a proportionally regulated valve which is controlled by a control current from an electric control unit which electronically processes the measured signals of a pressure sensor connected to the piston chambers of the suspension cylinders or links them to additional functional data or to external control signals from the working hydraulics.

5 Claims, 2 Drawing Sheets

HYDROPNEUMATIC SUSPENSION FOR VEHICLES HAVING GREATLY VARYING AXLE LOADS

BACKGROUND OF THE INVENTION

1. Field of the Invention

The invention relates to a hydropneumatic suspension for vehicles having greatly varying axle loads.

2. Description of Related Art

To improve the driving comfort of vehicles having greatly varying axle loads, it is desirable to adjust the front axle suspension performance to the different axle loads. Depending on the application, the front axle of a vehicle of this type, can be exposed to very low and very high static loads. Level regulators, which adjust the height of the suspended masses to that of the unsuspended masses by opening and closing directional control valves, are used in hydropneumatic suspension systems. In the dual-action hydraulic cylinders used in the suspension system, the cylinder pistons are kept at a medium level by regulating the level up or down.

A hydropneumatic suspension for motor vehicles having a wide range of axle loads is known from German Patent Application 41 20 758 A1, which uses dual-action hydraulic cylinders whose cylinder spaces are connected to a reservoir and whose annular spaces on the piston rod side are connected to an additional accumulator. A level-regulating valve regulates the height position, while a pressure-controlled valve regulates a preset pressure ratio between pressures in the first and second reservoirs as a function of the load on the hydropneumatic actuators. The pressure-controlled valve is actuated by both the pressure in the pressure line leading to the cylinder spaces and the pressure in the pressure line leading to the annular spaces.

German Patent 42 42 448 C1 describes another pressure regulation method which advantageously uses load-sensing pumps. This arrangement uses a pressure regulating valve that maintains a constant pressure level in the annular space of the suspension cylinder. The corresponding pressure level is assigned to the tractor load.

A device according to German Patent Application 197 19 077 A1 provides an especially advantageous way to improve driving comfort by using a load-adjusted two-way pressure regulating valve. This makes it possible to regulate even high load ratios and adjust the suspension to the load situations. The annular space pressure can be adjusted between the upper and lower limit value depending on the load.

The device according to German Patent Application 197 19 076 A1 differs from the one described in German Patent Application 197 19 077 A1 in that it uses an electric height regulator whose electronically processed control signals control solenoid valves.

Experience has shown that a two-way pressure regulating valve can adequately adjust the comfort level in tractor suspension systems. However, if a more sensitive adjustment is desired, taking additional dependencies into account, a multi-way pressure regulating valve is required, which is very expensive to implement according to the known functional principle.

SUMMARY OF THE INVENTION

It is an object of the invention to provide a control system that makes it possible to optimally adjust tractor driving comfort and performance to the conditions of the application at hand. There should not be any abrupt changes in suspension performance. The driver should feel an adequately gentle suspension action with uniform amplitudes in all conceivable driving situations.

In a hydropneumatic suspension for vehicles having greatly varying axle loads, in particular tractors having hydraulic suspension cylinders that are connectable to a pneumatic feed pump via supply lines—with a pressure regulating valve being provided in the supply line leading to the annular spaces of the suspension cylinders—these and other objects of the invention are achieved by designing the pressure regulating valve as a proportionally regulated valve which is controlled by a control current from an electric control unit and electronically processing the measured signals of a pressure sensor connected to the piston chambers of the suspension cylinders or linking them to additional functional data or to external control signals from the working hydraulics.

Achieving the object in this manner not only provides good adaptability of the spring rates, but also advantageously eliminates the need for control elements and connecting lines that are generally provided to operate the pressure regulating valve. The main advantage, however, is that the axle spring rate is continuously adjusted to the suspended axle load without interruption, thus making it possible to select any curve shape for the axle spring rate as a function of axle load and other operating states. As the servomotor adjusts the pressure regulating valve, the valve regulating spring is continuously adjusted to the pressure prevailing in the supply line leading to the piston chambers of the suspension cylinders, thereby continuously regulating the pressure in the annular spaces of the suspension cylinders.

BRIEF DESCRIPTION OF THE DRAWINGS

The present invention will be described in greater detail with reference to the following drawings wherein.

DETAILED DESCRIPTION OF THE INVENTION

Figure 1:
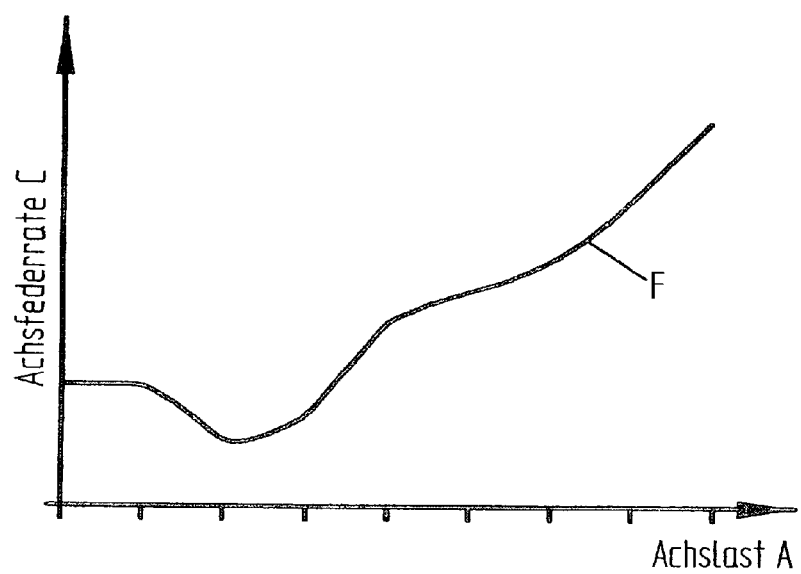
FIG. 1 shows a suspension characteristic in which the axle spring rate is plotted as a function of axle load.

FIG. 1 shows the variation of a spring characteristic F in the form of axle spring rate C as a function of axle load A at the front axle of a vehicle, which is possible with the application of the present invention. A suspension performance without abrupt changes in spring characteristic F is made possible by continuously monitoring the pressure in the piston chambers of the suspension cylinders and processing the measured signals in an electric control unit that continuously regulates the pressure regulating valve. Any shape of spring characteristic F is thus possible.

Figure 2:
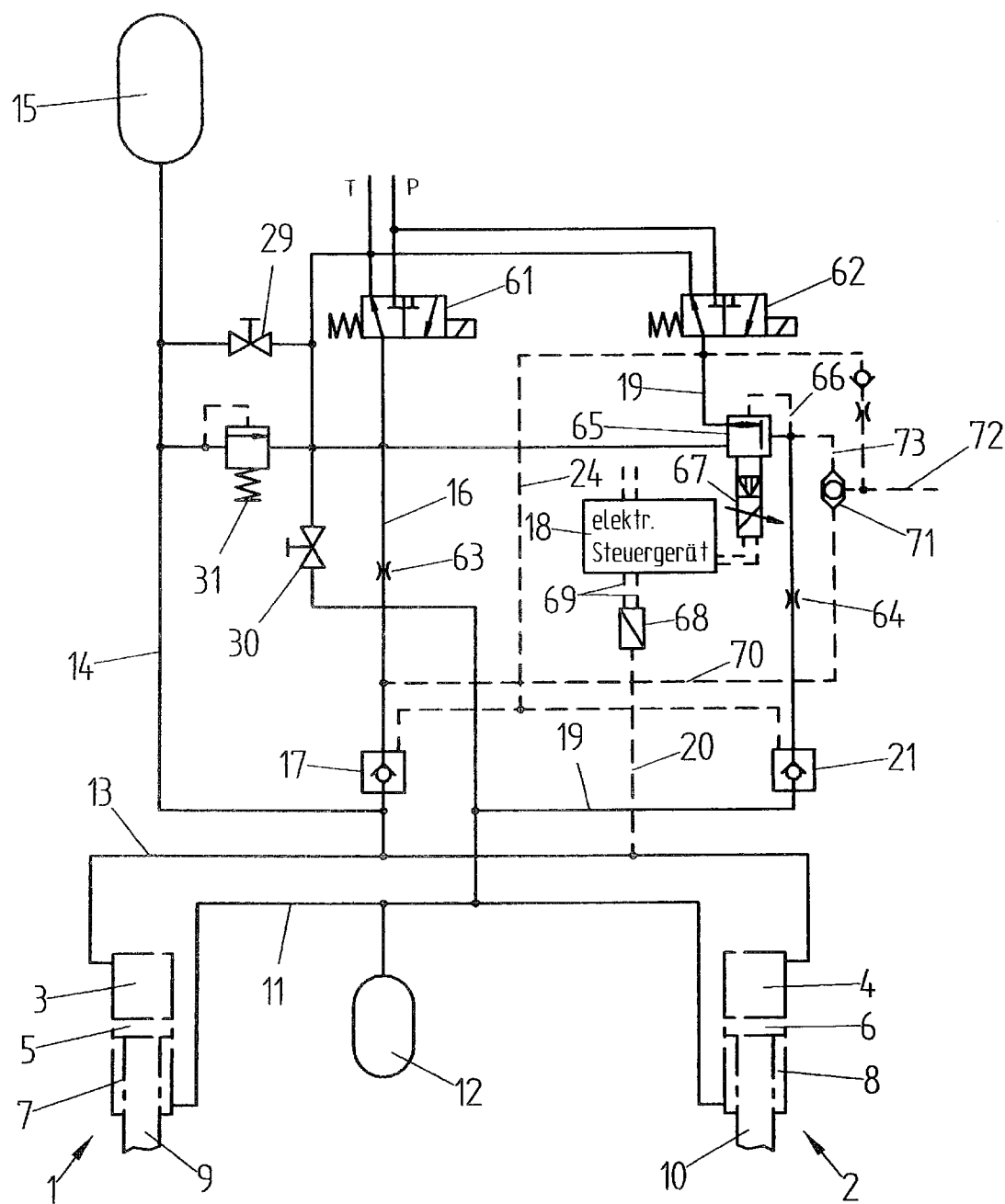
FIG. 2 shows a circuit diagram of the hydropneumatic suspension having a pressure regulating valve with an electromagnetic servomotor.

FIG. 2 shows the circuit diagram of the front axle suspension of a tractor vehicle. Suspension cylinders 1 and 2 are provided between the unsuspended and suspended masses, which are not illustrated in any further detail. They include piston chambers 3 and 4, which are separated from annular spaces 7 and 8 by pistons 5 and 6. Piston rods 9 and 10 are designed so that they are sealed to the outside. Both annular spaces 7 and 8 are interconnected by connecting line 11 and joined to hydraulic accumulator 12. Piston chambers 3 and 4 are interconnected via connecting line 13, which communicates with hydraulic accumulator 15 via line 14. Line 16 coming from ³⁄₂-way valve 61 connects to line 14. Throttle 63 and unlockable non-return valve 17 are provided in line 16. Control line 70 connects to supply line 16 between throttle 63 and non-return valve 17.

Supply line 19, which comes from ³⁄₂-way valve 62 and is also equipped with an unlockable non-return valve 21 and a throttle 64, empties into connecting line 11. Proportionally regulated pressure regulating valve 65 is provided between directional control valve 62 and throttle 64. Control line 66 of pressure regulating valve 65 is connected at the regulated pressure range of supply line 19. Pressure regulating valve 65 has electric servomotor 67, which receives the control signals from electric control unit 18. Pressure sensor 68 detects the pressure in cylinder spaces 3 and 4 at connecting line 13. The signals of sensor 68 are transmitted via electric lines 69 to control unit 18, where they are processed electronically and then passed on to servomotor 67. Control line 70 leads to shuttle valve 71 and from there to control line 72 leading to the load-sensing pump. Second control line 73 of shuttle valve 71 is connected to supply line 19 downstream from pressure regulating valve 65. Control line 24 for unlocking non-return valves 17 and 21 is connected to supply line 19 between level regulating valve 62 and pressure regulating valve 65.

The function of control unit 18 is to smooth the alternating electric signals of the pressure sensor during spring-cushioning of the vehicle so that a stabilized control signal can be transmitted to pressure regulating valve 65. Control unit 18 is advantageously designed to link additional control signals as a function of work operations, which was indicated with the control lines above the control unit.

Pressure sensor 68 is connected directly to connecting line 13 of piston chambers 3 and 4 via control line 20 so that uncorrupted pressure values can be detected.

The circuit is also equipped with pressure-relief valve 31 and service valves 29 and 30.

What is claimed is:

1. A hydropneumatic suspension for a vehicle which can handle extreme fluctuations in axle loads, comprising: a plurality of hydraulic suspension cylinders that are connectable to a pneumatic feed pump through a supply line, and a pressure regulating valve provided in the supply line leading to an annular space of the suspension cylinders, wherein the pressure regulating valve (65) is a proportionally regulated valve that is controlled by a control current from an electric control unit (18) which electronically processes the measured signals of a pressure sensor (68) which is connected to piston chambers (3, 4) of the suspension cylinders (1, 2).

2. The suspension according to claim 1, wherein the control unit (18) gates the signals of the pressure sensor (68) with additional functional data.

3. The suspension according to claim 1, wherein the pressure sensor (68) is hydraulically connected through a line (20) directly to the connecting line (13) joining the piston chambers (3, 4).

4. The suspension according to claim 2, wherein the pressure sensor (68) is hydraulically connected through a line (20) directly to the connecting line (13) joining the piston chambers (3, 4).

5. The suspension according to claim 1, wherein the vehicle is a tractor.

* * * * *

UNITED STATES PATENT AND TRADEMARK OFFICE
CERTIFICATE OF CORRECTION

PATENT NO.    : 6,644,096 B2
DATED         : November 11, 2003
INVENTOR(S)   : Brandenburger It is certified that error appears in the above-identified patent and that said Letters Patent is hereby corrected as shown below:

Column 3,
Line 2, change "$^3/_2$-way valve 61" to -- 3/2-way valve 61 --.
Line 6, change "$^3/_2$-way valve 62" to -- 3/2-way valve 62 --.

Signed and Sealed this

Thirteenth Day of September, 2005

JON W. DUDAS
*Director of the United States Patent and Trademark Office*